Nov. 13, 1956     E. J. GRIFFITHS     2,770,370

STACK TYPE FILTER WITH CHANNELED CENTER STANDARD

Filed March 7, 1952     3 Sheets—Sheet 1

INVENTOR.

Edgar J. Griffiths

BY

ATTORNEYS.

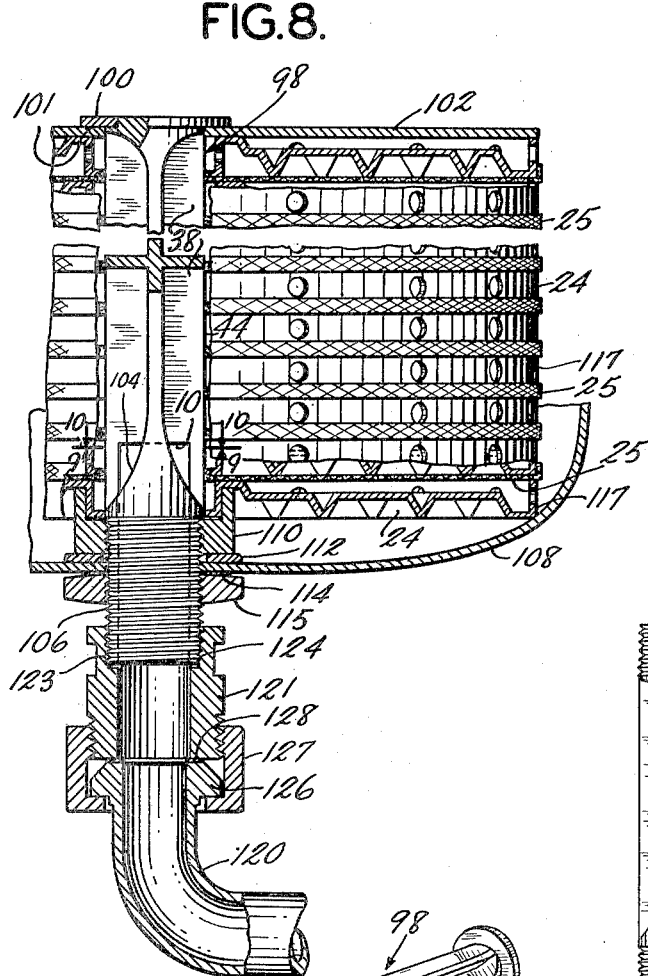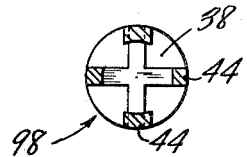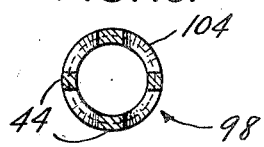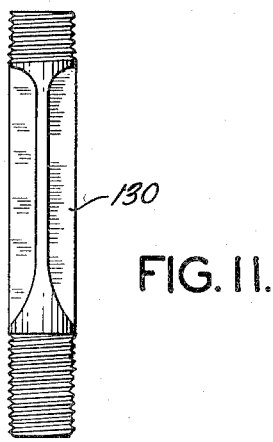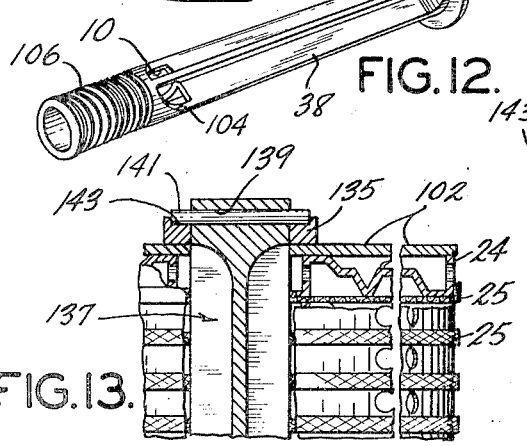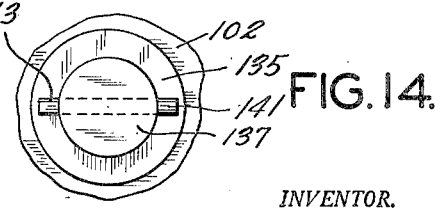

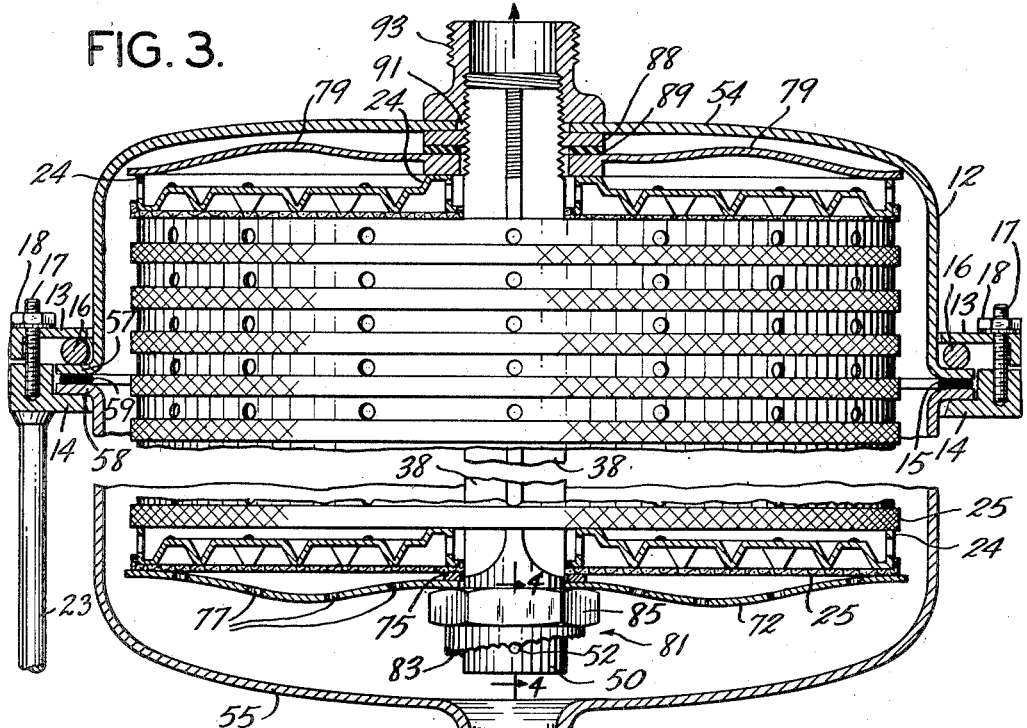
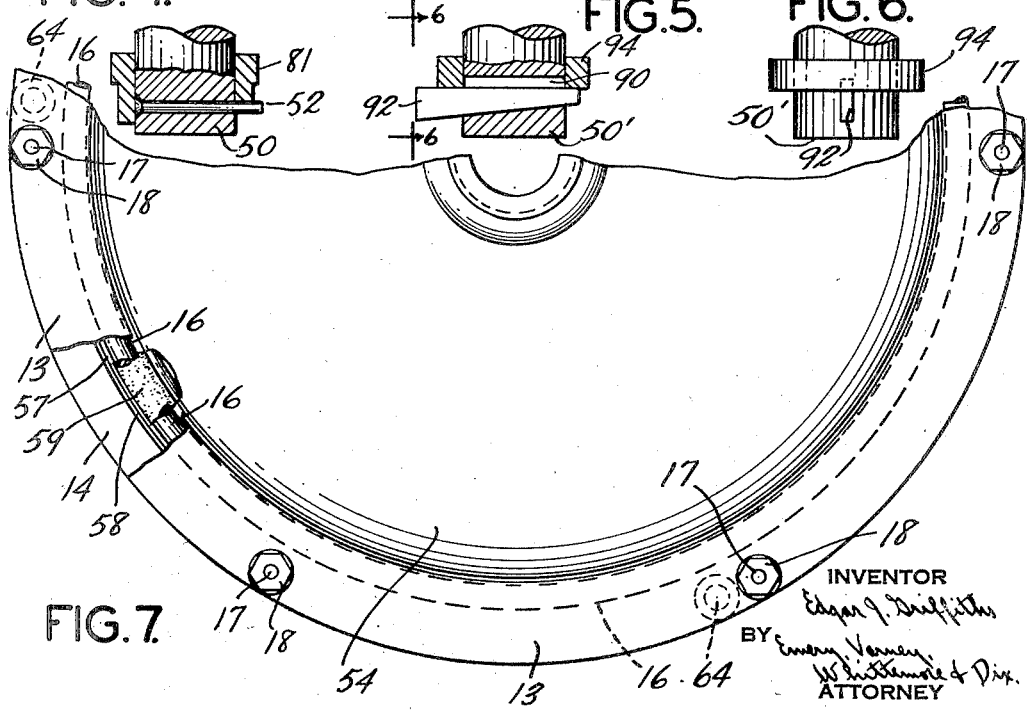

United States Patent Office 2,770,370
Patented Nov. 13, 1956

2,770,370

STACK TYPE FILTER WITH CHANNELED CENTER STANDARD

Edgar J. Griffiths, Pittsburgh, Pa.

Application March 7, 1952, Serial No. 275,431

2 Claims. (Cl. 210—183)

This invention relates to stack type filters in which a number of annular plates are held in alignment by a center standard that also serves as a tension element for clamping the stack of plates together.

Stack type filters have been used extensively in the dairy industry where a very high standard of cleanliness is required. Such filters have had center standpipes which had to be open at both ends to facilitate cleaning. When the filters were in use, however, the upper end of the standpipe had to be capped and it has been common practice to use the cap also as a clamping element for holding the plates together.

It is an object of this invention to provide an improved filter construction in which a center standard with channels in its outside wall is used in place of a standpipe, and the channels terminate short of the upper end of the center standard so that an open-ended clamping element can be used in place of a cap to hold the plates together. A clamping element open at both ends can be cleaned much more easily than a cap.

Another object is to provide an improved center standard, for a stack type filter, with channels extending from one end of the standard to a region near the other end, and with diverging side walls for the channels to facilitate cleaning. In the preferred construction the channels have sloping end walls so that there are no corners in the channels where three surfaces come together.

The center standard of this invention is preferably solid and serves both to align the plates and as the tension element for clamping the plates of the filter together. Screw threads on the standard are all on the outside where they are easily cleaned with a brush.

Channels with side walls that diverge toward the top of each channel are desirable because they facilitate cleaning. In the preferred construction of the invention, the channel has no bottom face but is made with side walls that meet at the bottom of the channel, either in a dihedral angle or with a radius at the juncture of the channel walls. An included angle of 90° between the side walls has been found satisfactory, but other angles can be used.

In one construction of the invention, the upper end of the center standard has a flange providing a shoulder in place of a clamping nut, and there are no threads at the upper end of the standard. This upper construction is combined with a lower construction having a tubular section into which the channels open and the threads at the lower end of the standard are beyond the channels and can be located outside of the milk zone to provide a stack type dairy filter with no screw threads in contact with the milk.

The filter of this invention is particularly advantageous for use in the food, paint and chemical industries where contamination, either germ or material, is a factor, and where it is necessary to open up filters thoroughly for inspection and cleaning.

Other objects, features and advantages of the invention will appear or be pointed out as the description proceeds.

In the drawing, forming a part hereof, in which like reference characters indicate corresponding parts in all the views, Fig. 1 is a fragmentary vertical sectional view through a stack type filter embodying this invention, Fig. 2 is a perspective view of the center standard used in the filter of Fig. 1, Fig. 3 is a sectional view through a stack-type filter embodying a modified form of the invention, Fig. 4 is a sectional view taken on the line 4—4 of Fig. 3, Fig. 5 is a view similar to Fig. 4 but showing a modified construction, Fig. 6 is an elevation of the modified construction shown in Fig. 5 when viewed from the line 6—6 of Fig. 5, Fig. 7 is a top plan view of a portion of the filter shown in Fig. 3, Fig. 8 is a fragmentary, sectional view showing a modified construction that is free of screw threads in the milk zone, Figs. 9 and 10 are sectional views taken on the lines 9—9 and 10—10, respectively, of Fig. 8.

Fig. 11 is a side elevation showing a second modified center standard that combines features of the constructions shown in both Figs. 2 and 8.

Fig. 12 is a perspective view showing another modified form of the center standard, Fig. 13 is a fragmentary, vertical sectional view showing a modified construction providing a collar at the top of the center standard for clamping the plates, and Fig. 14 is a top plan view of the structure shown in Fig. 13.

Figure 1:
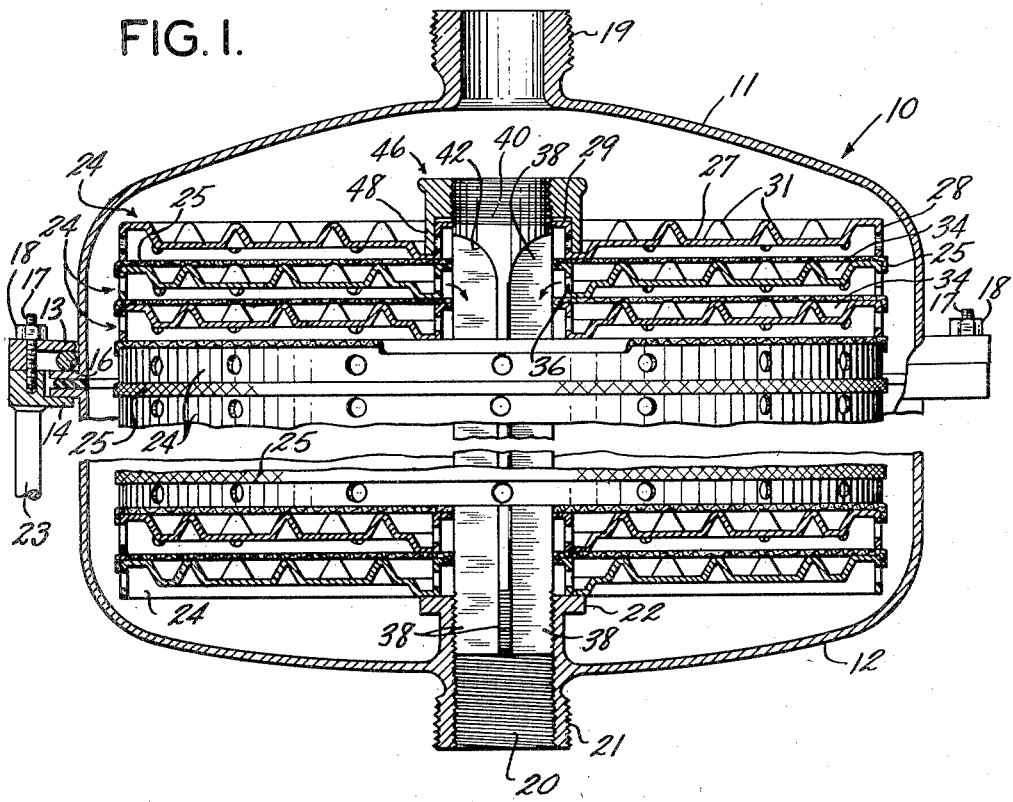

The filters with which this invention is concerned are filters of the type in which a stack of annular plates are superimposed upon one another and clamped together by a center standard which extends through the center openings in the plates.

Filters of this type clamp filter pads of various designs and materials between adjacent plates. Screens and perforated plates can be used under filter pads or cake that require more support than is provided by the ridges of the plates. Where screens are used, for supporting diatomaceous earth or other filter cake, or where perforated supporting plates are used, the screens or plates can be clamped between the plates of the stack in the same way as the filter pads are claimed in the construction shown in the drawing. The drawing shows plates that have rims with openings therein arranged so that liquid flowing in through openings in the outer rims passes through the filter pads and then discharges through openings in the inner rims and into the space formed by the center openings through the plates. The filter can also be used by turning the stack upside down and reversing the direction of flow. In this latter case the liquid enters into the space between the plates, through the openings in the inner rims, flows upward through the filter pads, and then out through the openings in the outer rims.

The filter shown in Fig. 1 includes a housing 10 having an upper shell 11 and a lower shell 12 with confronting rims along which the shells are connected together by clamping rings 13 and 14 with an intervening gasket 15 between the rims to effect a liquid-tight seal. A stud bolt 17, threaded into the lower clamping ring 14, extends upward through the upper clamping ring 13; and there is a nut 18 which is screwed down on the bolt 17 to press the rings 13 and 14 together. There is a metal ring 16, preferably a torus, between the upper clamping ring 13 and underlying rim of the upper shell 11.

In the preferred construction, the upper clamping ring 13 is made thicker along its outer circumferential edge beyond the bolt 17, and this thickened rim of the upper clamping ring contacts with the lower ring 14 and serves as a fulcrum about which the upper clamping ring moves into a downwardly dished contour as the nut 18 tightens the clamping ring 13 into greater pressure against the metal ring 16. There are a plurality of bolts 17 and nuts 18 located at angularly spaced regions around the clamping rings 13 and 14 so as to exert a substantially uniform pressure around the entire circumference of the housing.

There are threaded openings in the underside of the ring 14 for receiving the upper ends of legs 23 that support the lower shell 12 from a table or other underlying surface. There are preferably 3 legs at equal angular spacing around the housing 10.

A liquid inlet connection 19 on the upper shell is connected with suitable piping through which liquid is supplied to the filter. The lower shell 12 has an outlet 20 with threads 21 for connecting the filter with piping through which filtered liquid flows from the housing 10. There are threads inside the outlet 21 and there is a shoulder or abutment 22 around the upper end of the outlet 20.

A plurality of filter plates 24 are stacked one above the other with filter pads 25 between each of the plates 24 and the plate immediately below it. Each of the plates 24 is annular and comprises a body portion 27 with a downwardly extending outer rim 28 and an upwardly extending inner rim 29. There are discontinuous corrugations 31 at spaced regions on the body portion of each plate for supporting the overlying filter pad 25.

When the filter is in use the housing 10 is filled with liquid, and this liquid flows through openings 34 in the outer rims of the plates 24, and enters spaces between the filter plates and above the filter pads 25. The liquid passes downward through the filter pads 25 and flows out through openings 36 in the inner rims of the plates. The liquid then flows downward along channels 38 in a center standard 40. These channels extend to the extreme lower end of the center standard 40 and thus provide for the flow of liquid into and through the outlet 20.

The center standard 40 has threads at both ends, and although the channels 38 make the threads at the lower end of the standard 40 discontinuous, there are sufficient threads to firmly connect the standard 40 with the outlet connection 20.

The center standard 40 is preferably made of solid round stock and the channels 38 are milled in the surface by cutters that make V-section channels with the sides of each channel at 90° to one another. The milling cutters leave a rounded end 42 at the upper end of each channel, and this rounded end is preferable to a straight end wall because it avoids the existence of a tri-hedral angle forming a corner which would be difficult to clean.

It will be understood that the channels 38 can have cross sections of other shapes, and that they can be made with side walls diverging from one another by more than 90°.

The diameter of the bar used to make the center standard 40 is substantially equal to the diameter of the center openings through the plates 24 so that the center standard 40 will align the plates 24 and hold them against transverse displacement. With four channels at equal angular spacing around the circumference of the center standard 40, there are peripheral regions 44 on four sides of the center standard 40 for effectively preventing transverse displacement of the filter plates. Three channels can be used, provided that the angular extent of no one of them is of the order of 180° or more. More than four channels can be used if desired.

The filter pads 25 are clamped between the corresponding rims of successive plates so that the pads 25 are held securely around both their outer and inner edge portions. It is necessary that the plates be clamped together evenly and firmly in order to hold the filter pads 25 against the pressure of the liquid being filtered. If the pads are not clamped sufficiently tight, the pressure of the liquid forces the pads down between the supporting corrugations 31 and causes the loosely clamped edge portion to pull away from the rims of the plates so that the liquid can pass around an edge of the filter pad and thus short-circuit a portion of the filter.

The center standard 40 serves not only to align the filter plates 24, but also as the tension member for holding the filter plates together with the necessary pressure for clamping the filter pads in place. A nut 46 screws over the threads at the upper end of the center standard 40 and this nut 46 has a skirt 48 at its lower end which covers the openings 36 in the inner rim of the top plate 24 so that no liquid can flow through these openings and into the space enclosed by the inner rims of the plates 24. The face at the bottom of the nut 46 serves as an abutment for exerting clamping pressure against the upper plate 24 to force this plate downward and hold all of the plates of the stack together with the bottom plate clamped against the abutment 22.

The abutment face of the nut 46 that contacts with the upper plate 24 to clamp the stack of plates together is at the bottom of the skirt 48, in the construction illustrated, but the shoulder on the nut 46 immediately above the inner rim 29 of the top plate can be used as the clamping abutment if the skirt is shortened.

It is a feature of the invention that the channels 38 terminate short of the upper end of the center standard 40 so that the top face of the center standard is imperforate, and the upper cylindrical portion of the center standard above the ends of the channels 38 completely fills the threaded opening through the clamping nut 46.

This feature makes it possible to use a clamping nut that is open at both ends, and such nuts have the advantage that the threads can be easily cleaned with a brush inserted through the opening.

A modified filter construction shown in Figure 3 includes a stack of filter plates 24 with filter pads 25 clamped between them, as in the case of the filter shown in Figure 1. The filter plates are aligned by a center standard 50 which is similar to the center standard 40 of Figure 1 except that the standard 50 is threaded at only one end and has an opening for receiving a pin 52 through the end portion of the standard beyond the channels 38. The stack of filter plates in Figure 3 is turned up-side-down as compared with the stack in Figure 1 because the outlet of the filter in Figure 3 is at the top of the housing instead of at the bottom.

The housing comprises an upper portion 54 and a lower portion 55 with rims 57 and 58 respectively, along the edges at which these upper and lower portions of the housing meet one another. Ordinarily a gasket 59 is interposed between the rims 57 and 58 in order to insure a liquid-tight seal when the housing is closed. The rims 57 and 58 are clamped together by upper and lower rings 13 and 14 as in the construction shown in Figure 1.

In the usual construction of stack type filters, one of the end plates of the stack is inactive and this reduces the capacity of the filter. For example, if the filter includes 8 plates, and one of the end plates is inactive, the capacity of the filter is reduced 12½%. With the construction shown in Figure 3, all of the plates are used to their full capacity.

The lower end plate 24, which would ordinarily be covered by no filter pad on its projection side, is supplied with a filter pad 25, just as the other filter plates, and a resilient clamping plate 72 is used to hold this filter pad 25 in place. The resilient clamping plate 72 has a dished construction so that when it is placed on the center standard 50 it initially touches the filter pad 25 around the outer peripheral edge portion only.

As the inner edge portion of the resilient clamping plate 72 is urged progressively closer to the inner rim of the bottom filter plate 24, the plate 72 becomes less dished, and the pressure of the peripheral edge portion of the plate against the filter pad increases. The center portion of the clamping plate 72 is pressed into eventual contact with a washer 75 that clamps the filter pad 25 against the inner rim of the bottom filter plate 24.

The upward force on the clamping plate 72 is increased, by means which will be described hereinafter, until the inner edge of the filter pad is held against the filter plate with sufficient force to hold the filter pad in place while the filter is in use; and the stressed condition of the clamping plate 72 exerts sufficient force against the outer edge portion of the filter pad to hold that portion of the pad against displacement. There are a plurality of openings 77 in the clamping plate 72 for admitting liquid into the space between the clamping plate 72 and the filter pad 25. Liquid from this space flows through the filter pad and then through openings in the inner rim of the bottom filter plate 24 to the middle discharge space of the filter in the same way as in the filter described in Figure 1.

The upper plate 24 of the filter shown in Figure 3 is clamped by a resilient clamping plate 79 which is similar to the clamping plate 72 except that there are no holes in the upper clamping plate 79. One advantage of the dished clamping plates 72 and 79, which exert a high pressure against the outer rims of the filter plates 24, is that lighter and more resilient filter plates can be used because it is not necessary to transmit the clamping pressure across the plates from their inner rims to their outer rims, as in the case with the filter of Figure 1.

The lower end of the center standard 50 (Fig. 3) has a transverse opening into which the pin 52 is inserted, and this pin 52 is longer than the diameter of the standard 50 so that the end of the pin 52 extends for some distance beyond the surface of the center standard 50. A cam element 81 slips over the center standard 50 and has an end face 83 of helical form for contact with the extending end of the pin 52. The helical face 83 preferably has an uneven slope, such as the scalloped shape shown in Figure 3, so that there are a succession of rest stops with which the pin 52 can contact without having any tendency to slide down the incline of the helical end face. The upper portion of the cam element 81 is of polygonal cross section and has flat surfaces 85 for receiving a wrench which is used to turn the cam element so that it reacts against the pin 52 and is forced upwardly to clamp the plates together with more pressure.

A clamping nut 88 is screwed on the threads at the upper end of the center standard 50, and this clamping nut 88 holds a washer or gasket 89 against the inner edge portion of the upper resilient clamping plate 79. The upper end of the center standard 50 extends through an outlet opening 91 in the center of the upper portion 54 of the filter housing. The entire filter plate assembly is connected with the upper portion of the housing by an outlet fitting 93 that screws over the upper end of the center standard 50 and into contact with the top face of the housing. There are threads on the outlet fitting 93 for connecting the filter with piping through which liquid from the filter is discharged.

The cam means comprising the pin 52 and cam element 81 may be replaced with a pin that extends from both sides of the center standard 50. Such a double pin must be used with a cam element having two helical faces of not more than 180° angular extent, and this reduces the length of the sloping face with the result that the total possible displacement of the cam means must be less, or the pitch of the helix must be increased. A slow pitch has the advantage, however, that there is less danger of having the cam means back off from its tightened position as a result of vibration when the filter is in use. For cam elements of small axial extent, the double pin has an advantage because the cam force is applied evenly on both sides of the center standard and it is not necessary to have such a long bearing for the cam element on the center standard in order to prevent an uneven distribution for force around the circumference of the inner edge of the clamping plate 72.

Figures 5 and 6 show another cam means for tightening pressure of the plates against the filter pads. In this construction, the center standard is indicated by the reference character 50', and the difference in the construction of the center standard from that shown in Figures 3 and 4 is merely the substitution of a slot 90 in place of the cylindrical hole through which the pin 52 of Figures 3 and 4 extends.

This slot 90, of Figures 5 and 6, has a tapered bottom wall that co-operates with a similar taper on the bottom face of a wedge 92. The top face of the wedge 92 is preferably normal to the axes of the center standard 50'. A collar 94 slides on the outside surface of the center standard 50' and the bottom face of the collar 94 contacts with the upper face of the wedge 92. The bottom face of the collar preferably lies in a plane normal to the axes of the center standard 50' so that as the wedge 94 is driven further into the slot 90, the top face of the wedge raises the collar 94 with equal pressure at both sides of the center standard.

The advantage of using cam means for exerting clamping pressure against the lower end of the stack of filter plates is that the cam means take the place of threads which are difficult to clean. The opening through which the pin 52 (Fig. 4) extends, and the slot 90 (Figures 5 and 6) are large enough to be easily cleaned, and the pin 52 and wedge 92 have no inside corners or recesses in which dirt or bacteria can lodge.

Figure 2:
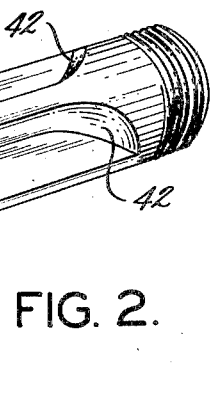

Figure 8 shows a modified construction which has no threads in the milk zone of the filter. A center standard 98 has channels 38 and peripheral regions 44 similar to the construction shown in Figure 2. The center standard 98 differs from that shown in Figure 3 in several important respects. In place of a threaded upper end, the standard 98 has a flange 100 that provides, on its underside, a shoulder 101 against which a rigid plate 102 abuts. The flange 100 can be made as a one-piece construction with the center standard 98, but it is more economical to use an annular element with a center hold that fits over a reduced diameter portion of the center standard. The separable flange 100 is welded or brazed to the center standard 98 and the parts are then ground or otherwise finished to produce a composite structure having smooth unbroken surfaces.

The channels 38 do not extend all the way to the lower end of the center standard 98 but terminate in outwardly curved surfaces similar to the upper terminations of these channels 38. The lower portion of the center standard 98 is tubular as far up as a face 104 which is located intermediate the lower and upper ends of the channels 38. Milk flowing down the channels 38 enters the tubular portion of the center standard 98 along the channels 38 which open into the tubular portion at their lower ends.

The lower end of the center standard 98 has threads 106 and this threaded end of the standard extends through an opening in a bottom shell 108 of the filter. A skirted nut 110 screws over the threads 106 and clamps against the bottom filter plate 24. The stack of filter plates is compressed between the nut 110 and the plate 102 at the top of the stack. The filter plates 24 and intervening pads 25 are assembled with the standard 98 with the standard placed upside down, that is, with the flange 100 and the plate 102 at the bottom.

After the skirted nut 110 has been screwed down tightly against the filter plate 24, so that the stack of plates is firmly clamped, the assembly is turned over and placed in the shell 108 of the filter by pushing the threaded end 106 of the center standard downward through the hole in the bottom of the shell 108. A packing washer 112 is located between the nut 110 and the bottom of the shell 108 in order to insure a liquid-tight seal. A paper gasket 114 is then placed over the threaded end of the center standard 98 above a compression nut 115 which is screwed upward along the threads 106 until it clamps the gasket against the bottom of the shell 108. This secures the center standard 98 and its plate assembly in position in the filter housing. The bottom shell 108 is preferably shaped so that the lower corner of the peripheral edge 117 of the plate 24 contacts with the inside face of the shell 108 when the filter plate assembly is pulled down in the shell by the compression nut 115. This pressure created by the pull of the nut 110 forces the bottom plate 24 against the housing and creates additional pressure, in cooperation with the heavy top plate 102, at the outer edges of the filters.

The top shell of the filter housing is then placed over the bottom shell 108 and milk is supplied to the filter housing through an inlet in the top shell in a manner similar to that shown in Figure 1. The lower end of the center standard 98 comprises the outlet of the filter illustrated in Fig. 8, and this lower end of the center standard is connected with a delivery pipe 120 through an adapter 121 which screws over the threads 106.

There is a shoulder 123 in the adapter 121 in position to contact with the end face of the center standard 98. A paper gasket 124 is preferably used between the metal surfaces of the shoulder 123 and the end face of the center standard 98. In the preferred construction, the inside diameter of the adapter 121 is equal to the inside diameter of the tubular portion of the center standard 98 so as to provide a smooth inside wall for the conduit through which the milk flows to the delivery pipe 120.

There is a flange 126 at the upper end of the outlet pipe 120 and this flange is clamped against the bottom of the adapter 121 by a clamping nut 127, as in the case of the other connections, a paper gasket 128 is preferably clamped between the metal surfaces of the flange 126 and the confronting end face of the adapter 121.

Figure 11 shows a modification of the center standard illustrated in Figure 8. The center standard of Figure 11, designated by the reference character 130, differs from the center standard 98 of Figure 8 only at the top. In place of the flange 100 shown in Fig. 8, the center standard 130 of Fig. 11 has a threaded upper end which is used in the same way as the threaded upper end of the center standard shown in Fig. 1. This standard 130 has the disadvantage of locating some screw threads within the filter, but the threads are sanitary modified acme threads which are easily cleaned and the standard 130 can be used with different types of filter constructions, such as that shown in Fig. 1, which are not adapted for use with the flanged center standard 98 of Fig. 8.

Fig. 12 is a perspective view of the center standard 98. This view shows the tubular end portion below the face 104.

Figs. 13 and 14 show a construction which eliminates the necessity for securing the flange 100 to the upper end of the center standard. In the construction illustrated in these figures, an annular ring 135 fits over the upper cylindrical end of a center standard 137. This ring 135 fits closely around the center standard but with enough clearance so that it can be easily put on and taken off the upper end of the center standard 137.

An opening 139 extends transversely through the cylindrical upper portion of the standard 137 in a direction at right angles to the axis of the standard. A pin 141 fits the opening 139 as a running fit, and this pin is somewhat longer than the opening so that the ends of the pin extend beyond the opposite sides of the cylindrical surface at the upper end of the standard 137. There is a recess 143 in the top face of the ring 135. The bottom of this recess is preferably curved and of substantially the same radius as that of the pin 141, but the recess 143 does not extend across the full diameter of the ring. It is, however, at least as long as the pin 141, and it can be somewhat longer.

When the filter is assembled, the pin 141 is located in the opening 139, with the ends of the pin extending from the opposite ends of this opening. The ring 135 is pressed upward against the pin 141 with the ends of the pin located in the portions of the recess 143 at opposite sides of the central opening through the ring 135. The end walls of the recess 143 prevent longitudinal displacement of the pin 141. The stack of plates are clamped against the under side of the ring 135 with the heavy plate 102 in direct contact with the ring 135. The stack of plates 24, with the filter elements between them, are clamped together as in Fig. 8.

This construction illustrated in Fig. 3 has the advantage that it is more economical to manufacture because there is no flange attached to the upper end of the center standard, and it has the further advantage of eliminating the sharp corner between the center standard and the flange located at the top of the standard in the construction shown in Fig. 8. The opening 139 is large enough to admit a brush for easy cleaning, and the pin 141 has no recesses or corners that are difficult to clean. The groove 143 is shallow enough and has a rounded bottom so that even with its end walls it is easily cleaned.

Terms of orientation in the description and claims are relative. Changes and modifications can be made in the construction illustrated, and some features of the invention can be used alone and in different combinations without departing from the invention as defined in the claims.

I claim as my invention:

1. A stack type liquid filter comprising a housing with an outlet, a stack of annular filter plates having a center opening therethrough and located within the housing, the plates of said stack having surfaces around their outer and inner edges for clamping filter elements between the plates, and said plates enclosing chambers between them and having openings for the passage of liquid into and out of the chambers for passage through the filter elements that are clamped between the successive plates, a standard extending through the outlet of the housing and extending through the center opening of the stack, the standard having a width substantially equal to the diameter of said center opening and aligning the filter plates with one another, a threaded element located inwardly of the outlet of the housing, threads on one end of the standard for screwing the standard into said threaded element, the threads on the standard stopping short of the part of the standard within the center opening through the stack, an abutment at the other end of the standard having an annular bottom face for contact with the stack to hold the plates of the stack together under pressure with the filter elements between them and the standard serving as a tension member, said standard having channels in its circumferential surface extending lengthwise of the standard for a substantial distance from the abutment face and along the portion of the standard that is surrounded by the stack of filter plates, the channels terminating short of the threaded end of the standard, and said standard having its threaded end of a width at least as small as the center opening through the stack of plates and tubular for a distance beyond the threads and within a portion of the length of the standard having the channels therein, the tubular part of the standard being unobstructed and of circular cross section and opening at its upper end into the channels beyond the threads of the standard and providing a passage for flow of liquid from the channels into the tubular part of the standard and through the outlet of the housing, and means sealing the liquid from flow in contact with the threaded portion of the standard.

2. The stack type liquid filter described in claim 1 and in which the standard is of generally circular cross section at the ends of the channels, the channels being of progressively decreasing depth at both ends so as to merge gradually into the full diameter of the standard beyond the ends of the channels.

References Cited in the file of this patent

UNITED STATES PATENTS

| | | |
|---|---|---|
| 630,363 | Krause | Aug. 8, 1899 |
| 1,958,258 | Goldman | May 8, 1934 |
| 1,976,547 | Dumas | Oct. 9, 1934 |
| 2,095,470 | Foley | Oct. 12, 1937 |
| 2,216,646 | Mantz | Oct. 1, 1940 |
| 2,360,020 | Skinner | Oct. 10, 1944 |
| 2,365,525 | Cox | Dec. 19, 1944 |
| 2,536,690 | Miller | Jan. 2, 1951 |
| 2,581,337 | Lapik | Jan. 8, 1952 |
| 2,583,963 | O'Meara | Jan. 29, 1952 |
| 2,602,548 | Griffiths | July 8, 1952 |

FOREIGN PATENTS

| | | |
|---|---|---|
| 344,932 | Great Britain | Mar. 16, 1931 |